US010806122B1

(12) United States Patent
Torres et al.

(10) Patent No.: US 10,806,122 B1
(45) Date of Patent: Oct. 20, 2020

(54) AUTOMATED HORSE FEEDER

(71) Applicants: Tio Torres, Wichita Falls, TX (US); Christopher Torres, Cisco, TX (US)

(72) Inventors: Tio Torres, Wichita Falls, TX (US); Christopher Torres, Cisco, TX (US)

(*) Notice: Subject to any disclaimer, the term of this patent is extended or adjusted under 35 U.S.C. 154(b) by 369 days.

(21) Appl. No.: 15/588,869

(22) Filed: May 8, 2017

Related U.S. Application Data

(60) Provisional application No. 62/333,167, filed on May 7, 2016.

(51) Int. Cl.
*A01K 5/02* (2006.01)
*A01K 5/00* (2006.01)
*A01K 29/00* (2006.01)

(52) U.S. Cl.
CPC ............ *A01K 5/0291* (2013.01); *A01K 5/008* (2013.01); *A01K 29/005* (2013.01)

(58) Field of Classification Search
USPC ............ 119/51.11, 58, 51.01, 52.1, 56.1, 60, 119/61.1, 61.3, 51.13, 57.92, 61.57, 119/65–69
See application file for complete search history.

(56) References Cited

U.S. PATENT DOCUMENTS

| | | | | |
|---|---|---|---|---|
| 336,597 A * | 2/1886 | Scovill | | |
| 1,054,226 A * | 2/1913 | McAllister | ............. | A01K 5/008 119/65 |
| 1,196,061 A * | 8/1916 | Winslow | ................. | A01K 5/008 119/68 |
| 4,131,082 A * | 12/1978 | Sollars | ..................... | A01K 5/02 119/51.5 |
| 4,665,862 A * | 5/1987 | Pitchford, Jr. | ........ | A01K 5/0275 119/51.11 |
| 5,394,832 A * | 3/1995 | Briley | ...................... | A01K 5/01 119/51.11 |
| 5,555,842 A * | 9/1996 | Chocola | ............... | A01K 5/0258 119/51.11 |
| 5,735,231 A * | 4/1998 | Terenzi | ................ | A01K 5/0291 119/51.11 |
| 6,161,503 A * | 12/2000 | Blas | ...................... | A01K 5/0291 119/51.12 |
| 6,619,228 B2 * | 9/2003 | Voogd | .................. | A01K 5/0275 119/51.02 |
| 7,204,201 B2 * | 4/2007 | Leombruno | ......... | A01K 5/0225 119/56.1 |
| 7,380,518 B2 * | 6/2008 | Kates | ..................... | A01K 15/02 119/51.01 |
| D742,078 S * | 10/2015 | Singh | ........................... | D30/121 |
| 9,380,761 B2 * | 7/2016 | Graves | ..................... | A01K 5/01 |
| 2010/0018467 A1 * | 1/2010 | Massicotte | ........... | A01K 5/0275 119/57.7 |
| 2012/0266824 A1 * | 10/2012 | Trauttmansdorf | ............. | 119/65 |
| 2016/0174521 A1 * | 6/2016 | Davis | ................... | A01K 5/0114 119/57.1 |

* cited by examiner

Primary Examiner — Andrea M Valenti
(74) Attorney, Agent, or Firm — Kenneth L. Tolar

(57) ABSTRACT

An automated horse feeder includes a housing having a front wall, a rear wall, a top wall, a bottom wall and an interior feed chamber. The rear wall includes a pair of L-shaped hangers for suspending the housing from a stall board or other suitable support surface. At predefined, programmable intervals, a controller opens a release hatch on the bottom wall of the housing and rotates an internal auger to gradually dispense feed from the chamber into an underlying nosebag.

11 Claims, 3 Drawing Sheets

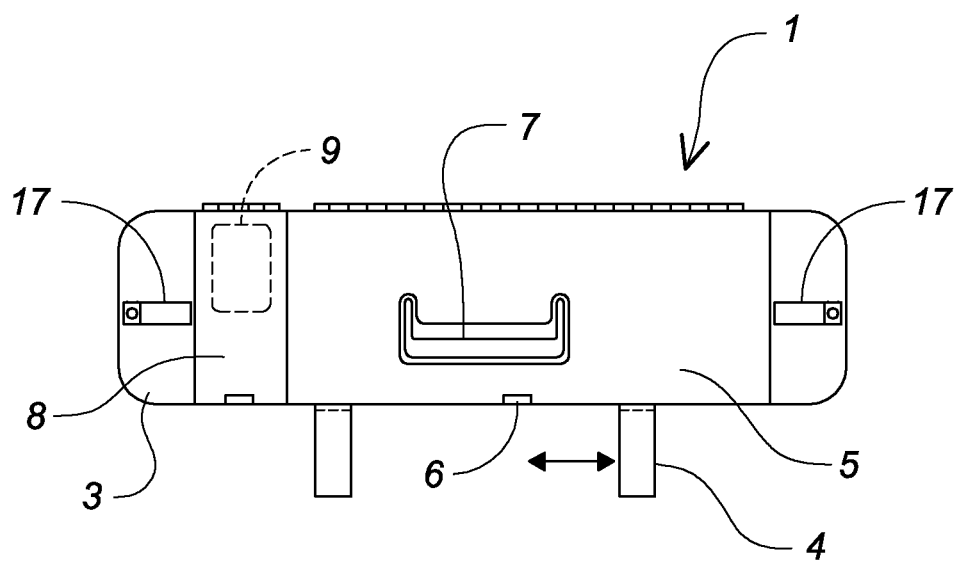
Fig. 3
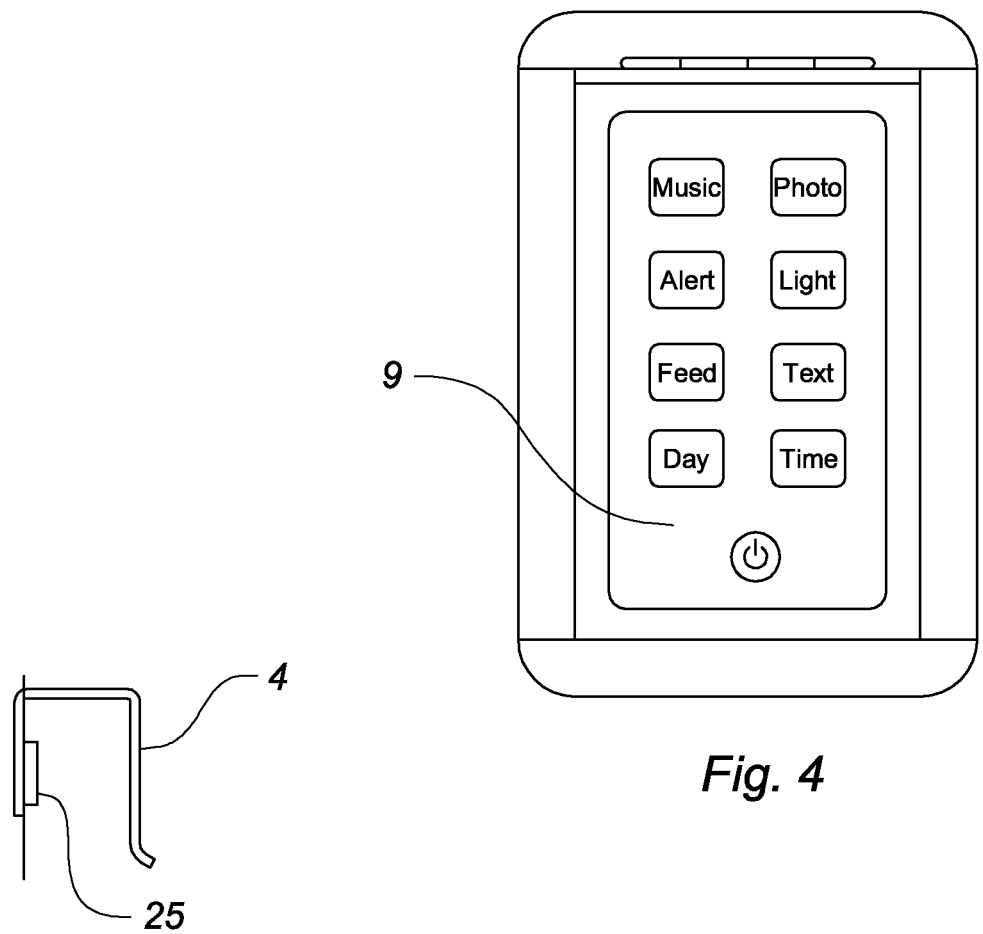
Fig. 4
Fig. 5

AUTOMATED HORSE FEEDER

CROSS REFERENCE TO RELATED APPLICATIONS

This application is entitled to the benefit of provisional patent application No. 62/333,167 filed on May 7, 2016, the specification of which is incorporated herein by reference.

BACKGROUND OF THE INVENTION

The present invention relates to a programmable, automated horse feeder that eliminates the burdensome task of manually feeding a horse.

DESCRIPTION OF THE PRIOR ART

Typically, a worker, owner or other care provider must regularly appear at a barn or stable in order to properly feed a horse, which is burdensome and inconvenient. If a familiar care provider is unavailable, he or she may assign the task to a stranger, who often frightens the horse, causing unruly and sometimes dangerous behavior.

In addition, many horses are restricted to a carefully designed diet due to certain health conditions or when adhering to recommended training guidelines. However, if the regular care provider is unavailable, the horse may be deprived of a prescribed regimen, which can cause serious health problems, behavioral issues or poor performance.

Accordingly, there is currently a need for a device that eliminates the burdensome task of manually feeding a horse. The present invention addresses this need by providing an automated horse feeder that delivers food to a suspended nosebag at preprogrammed intervals to assure that a horse is properly and routinely fed.

SUMMARY OF THE INVENTION

The present invention relates to an automated horse feeder comprising a housing having a front wall, a rear wall, a top wall, a bottom wall and an interior feed chamber. The rear wall includes a pair of L-shaped hangers for suspending the housing from a stall board or other suitable support surface. At predefined, programmable intervals, a controller opens a release hatch on the bottom wall of the housing and rotates an internal auger to gradually dispense feed within the chamber into an underlying nosebag.

It is therefore an object of the present invention to provide an automated horse feeder that eliminates the burdensome task of manually feeding a horse.

It is therefore another object of the present invention to provide an automated horse feeder that dispenses feed into a suspended nosebag at regular, desired intervals.

Other objects, features, and advantages of the present invention will become readily apparent from the following detailed description of the preferred embodiment when considered with the attached drawings and the appended claims.

BRIEF DESCRIPTION OF THE DRAWINGS

FIG. 3 is a top view of the housing.

FIG. 4 is an isolated view of the keypad.

FIG. 5 is an isolated view of the hanger and strap sleeve.

DESCRIPTION OF THE PREFERRED EMBODIMENT

Figure 1:
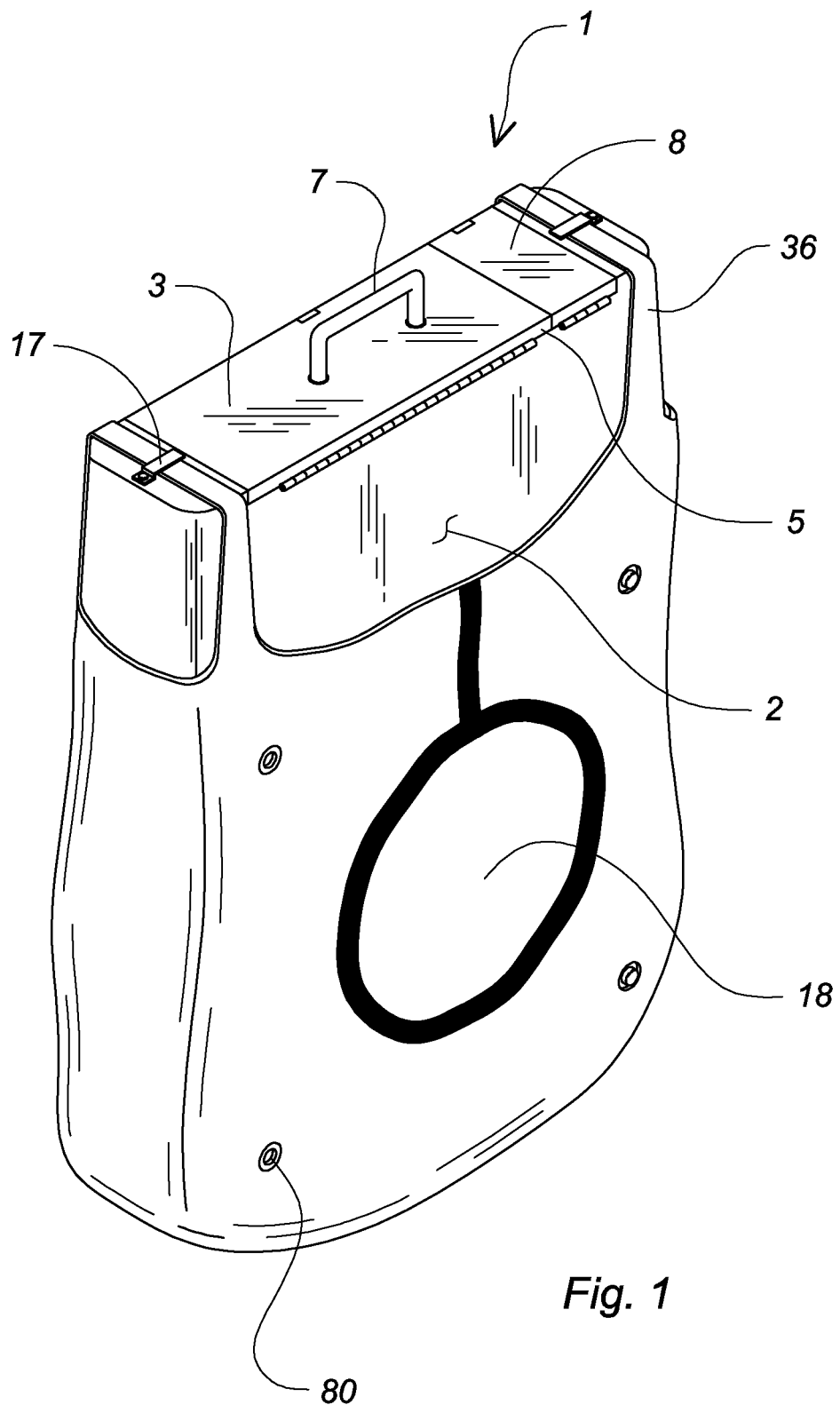
FIG. 1 is a perspective view of the automated feeder according to the present invention.
Figure 2:
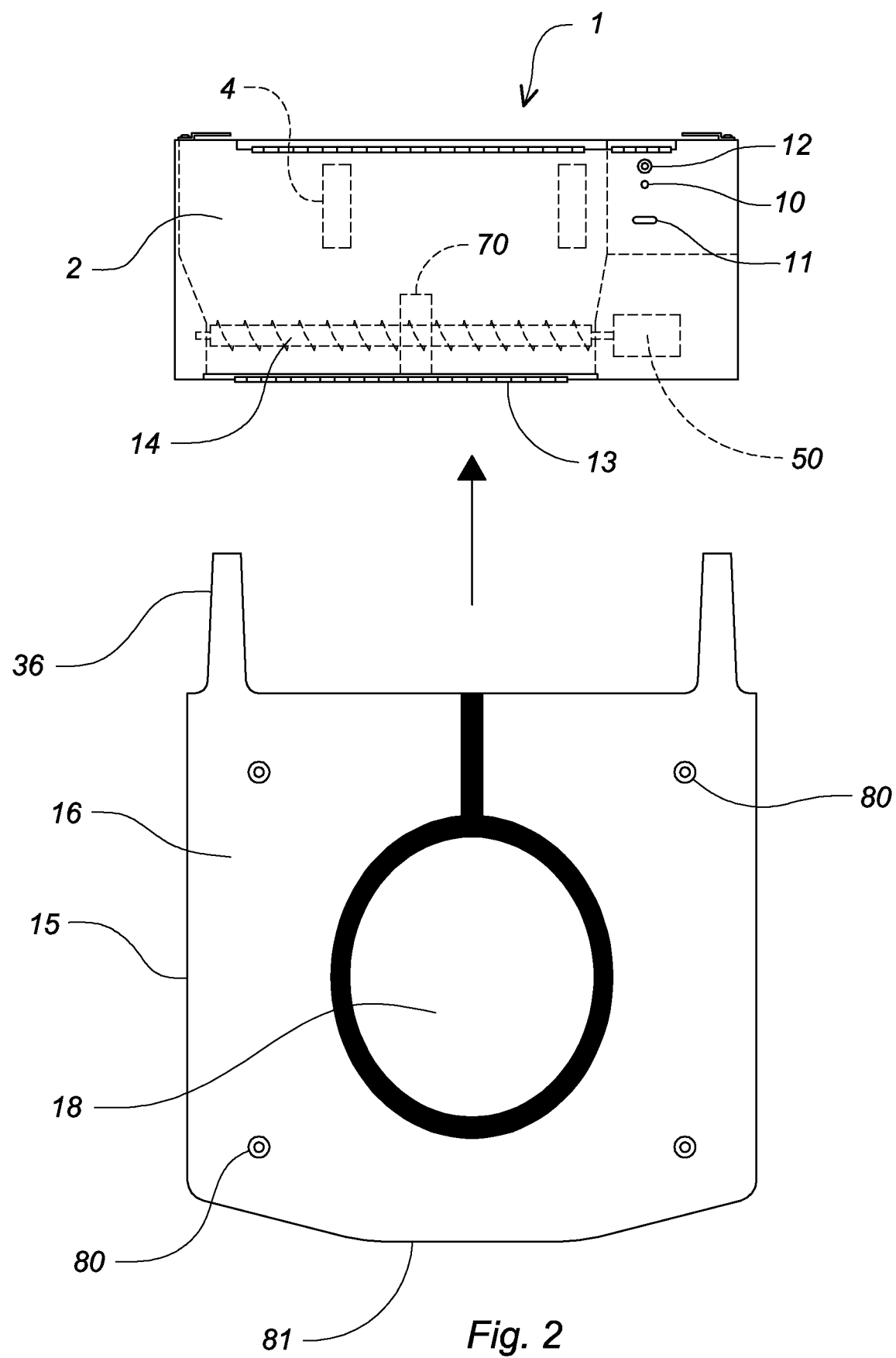
FIG. 2 is a front, exploded view of the feeder.

The present invention relates to an automated horse feeder comprising a housing 1 having a front wall 2, a rear wall, a top wall 3, a bottom wall and an interior feed chamber. The rear wall includes a pair of L-shaped hangers 4 for suspending the housing from a stall board or other suitable support surface. Adjacent each hanger is a sleeve 25 that receives a safety strap (not pictured) for further securing the housing to the support surface. At least one of the hangers is laterally slidable to adapt to available space on a given board.

On the top wall is a pivotal door 5 that is released by a locking latch 6 to provide selective access to the feed chamber. The door includes a handle 7 that allows a user to easily transport the device whenever the door is latched. Adjacent to the door is a pivotal cover 8 superimposed on a keypad 9 that is used to program a controller to perform specific functions at preset dates and times as described below.

The front wall of the housing includes an LED 10, a two-way speaker 11 and a video camera 12. The speaker and camera are in communication with a wireless telephone transceiver that allows an owner, a care provider or another supervisor to observe, hear or speak to a nearby horse. The controller defaults to a WiFi connection in lieu of the cellular transceiver for remote monitoring when a nearby network is available. The LED is activated to provide additional illumination for the surrounding area when needed.

On the bottom wall of the housing is a spring-biased release hatch 13 that is moved between open and closed positions by a solenoid 70 in response to a predetermined command from the controller. Within the feed chamber, immediately above the hatch, is an auger 14 that is rotated by a motor 50 to gradually dispense feed within the chamber through the release hatch.

The device also includes a nosebag 15 including a hollow sack having a front surface 16, a rear surface, a lower end 81 and an open top in communication with an interior food receptacle. At the open upper end are a pair of cuffs 36 for suspending the sack from the housing. A pair of movable tabs 17 on the top wall of the housing are slid over the cuffs to prevent a horse from dislodging the nosebag. The front surface of the sack includes a reinforced access opening 18 through which a horse can insert the head to retrieve feed from the food receptacle. The lower end 81 is sloped downwardly from the sides to a central portion to direct feed toward the opening for easier access by a horse. Mating snaps 80 on the front surface allow the bag to be folded onto itself and secured to enclose the reinforced opening when the bag is being transported or stored.

Accordingly, the housing is suspended from a barn wall or other desired support surface where a horse is routinely stationed. A user opens the pivotal door, loads the chamber with a desired foodstuff and enters select feeding dates and times into the keypad. The nosebag is suspended from the housing with the open top positioned beneath the release hatch. At the preprogrammed intervals, the controller activates the auger and opens the release hatch to dispense stored feed into the food receptacle.

The above-described device is not limited to the exact details of construction and enumeration of parts provided herein. For example, optionally the device can be used to feed smaller or horned animals incapable of accessing the feedbag by lowering the housing and dispensing the feed into a trough or other container. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An automated horse feeder comprising:
   a housing having a rear wall, a font wall, a bottom wall, a top wall, a lower end and an interior feed chamber with feed stored therein; said housing is portable and in operation is suspended from a support surface;
   a feedbag having a front surface, a rear surface and an open top in communication with an interior food receptacle, said open top having a pair of cuffs gripping the top wall of said housing for suspending said feedbag from said housing, wherein a horse feeds from the feedbag through an access opening in said feedbag while the feedbag is suspended from said housing;
   a programmable controller controlling transfer of feed from said feed chamber into said feedbag at a desired interval and for a desired duration, an opening at a lower end of the housing and superimposed on the open top of said feedbag, a release hatch positioned within said opening, said hatch movable to an open position and away from said opening, and a solenoid connected to said release hatch and in communication with said programmable controller for automatically moving said release hatch to the open position upon receipt of a predetermined command from said controller.

2. The automated horse feeder according to claim 1 further comprising a motorized auger received within said feed chamber that is activated by said controller when the release hatch is moved to the open position to facilitate feed dispersal through said opening.

3. The automated horse feeder according to claim 1 further comprising:
   a speaker and a video camera on the front wall of said housing, said speaker and said video camera in wireless communication with a portable electronic device to allow a supervisor to interact with a horse near the housing.

4. The automated horse feeder according to claim 3 further comprising an LED on the front wall of said housing that provides additional illumination for a surrounding area.

5. The automated horse feeder according to claim 1 further comprising a pair of tabs slidably positioned on the top wall of said housing that are movable over said cuffs to prevent a horse from dislodging said feedbag.

6. The automated horse feeder according to claim 1 wherein the front surface of the feedbag includes a reinforced access opening for receiving a horse's head when retrieving feed from the food receptacle.

7. The automated horse feeder according to claim 1 further comprising a pair of hangers on the rear wall of said housing for suspending the automated horse feeder from a support surface.

8. The automated horse feeder according to claim 7 further comprising a sleeve adjacent each hanger that receives a safety strap for further securing the housing to the support surface.

9. The automated horse feeder according to claim 7 wherein at least one of the hangers is laterally slidable on the rear wall of the housing to adapt to available space on a given board.

10. The automated horse feeder according to claim 1 further comprising a locking, pivotal door on the top wall of said housing that provides selective access to the feed chamber.

11. The automated horse feeder according to claim 10 further comprising a pivotal cover adjacent to said pivotal door, said cover superimposed on a keypad that operates said controller.

* * * * *